US005951194A

United States Patent [19]

Faass et al.

[11] Patent Number: 5,951,194

[45] Date of Patent: *Sep. 14, 1999

[54] ATTACHMENT ELEMENT FOR A BODY IN A WALL

[75] Inventors: Manfred Faass, Pfinztal; Michael Schneider, Karlsbad, both of Germany

[73] Assignee: Moto Meter GmbH, Leonberg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,668

[22] PCT Filed: Oct. 13, 1995

[86] PCT No.: PCT/DE95/01410

§ 371 Date: Apr. 21, 1997

§ 102(e) Date: Apr. 21, 1997

[87] PCT Pub. No.: WO96/14512

PCT Pub. Date: May 17, 1996

[30] Foreign Application Priority Data

Nov. 8, 1994 [DE] Germany ............................ 44 39 797

[51] Int. Cl.$^{6}$ ...................................................... B25G 3/00

[52] U.S. Cl. ......................... 403/256; 403/315; 403/319; 403/405.1; 403/407.1; 411/339; 411/508; 411/913; 24/453

[58] Field of Search .................................... 403/233, 315, 403/319, 256, 326, 327, 329, 405.1, 406.1, 407.1, 408.1, 289, 290, 364, DIG. 8, 409.1; 411/339, 338, 508, 509, 510, 913; 24/453, 297, 572, 580; 285/308, 921

[56] References Cited

U.S. PATENT DOCUMENTS

| | | | |
|---|---|---|---|
| 3,115,804 | 12/1963 | Johnson | 411/338 |
| 3,588,149 | 6/1971 | Demler, Sr. et al. | 285/307 X |
| 4,636,107 | 1/1987 | Casler et al. | 403/405.1 |
| 4,920,618 | 5/1990 | Iguchi | 24/453 |
| 4,973,102 | 11/1990 | Bien | 411/339 X |
| 5,143,500 | 9/1992 | Schuring et al. | 411/339 |
| 5,207,546 | 5/1993 | Bouverie | 24/453 X |
| 5,291,639 | 3/1994 | Baum et al. | 24/453 X |
| 5,340,165 | 8/1994 | Sheppard | 285/226 |
| 5,346,264 | 9/1994 | Law et al. | 285/921 X |
| 5,374,088 | 12/1994 | Moretti et al. | 285/308 X |
| 5,520,420 | 5/1996 | Moretti | 285/308 X |
| 5,568,675 | 10/1996 | Asami et al. | 24/297 |
| 5,624,130 | 4/1997 | Ricks | 24/453 X |
| 5,741,102 | 4/1998 | Everett et al. | 411/339 |
| 5,758,987 | 6/1998 | Frame et al. | 24/453 X |

FOREIGN PATENT DOCUMENTS

| | | |
|---|---|---|
| 38 12 182 | 10/1989 | Germany . |
| 679441 | 9/1952 | United Kingdom . |
| 1 581 773 | 12/1980 | United Kingdom . |

*Primary Examiner*—Daniel P. Stodola
*Assistant Examiner*—Bruce A. Lev
*Attorney, Agent, or Firm*—Kenyon & Kenyon

[57] ABSTRACT

An attachment element for a body which can be inserted through a bore in a wall. The attachment, element fixes the body in place by being locked in place. The attachment element is structured to be resilient and can be deformed in such a way, by pressing on suitable points, that the catch hooks are unlocked when pressure is exerted. In this way, the attachment element can be easily released again, without tools and in simple manner.

12 Claims, 1 Drawing Sheet

12 3 5 5a 4 11 10 9 8 2

FIG. 1
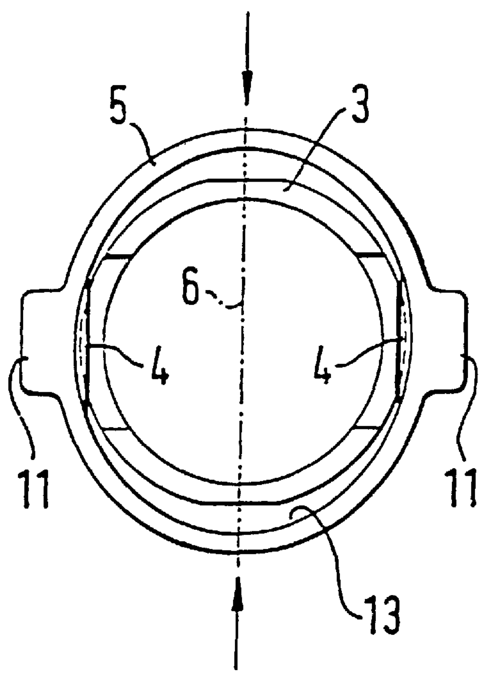
FIG. 2
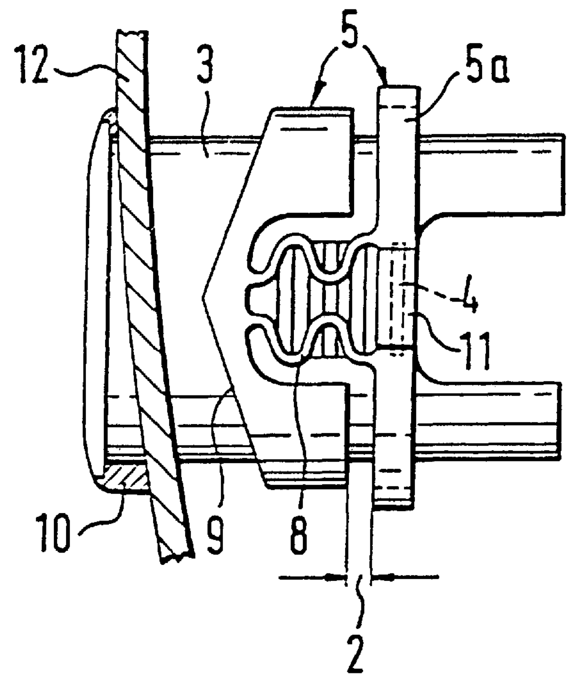
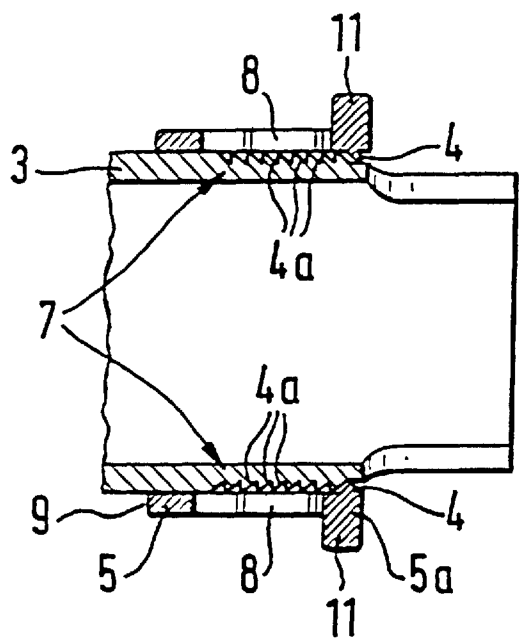
FIG. 3

ATTACHMENT ELEMENT FOR A BODY IN A WALL

BACKGROUND INFORMATION

German Patent Application No. 38 12 182 describes an ultrasound transducer with a cylinder-shaped body; to attach it, this body is inserted through a bore in a bumper of a motor vehicle and secured from falling out, from the back, using a resilient element. It has been shown that such an element can only be installed in a restricted installation angle relative to the wall. Different vehicle types, however, can have various angles of inclination relative to the road surface, so that different attachment elements might be necessary, depending on the vehicle type. However, producing these different attachment elements increases the production and warehousing costs and is therefore undesirable. Furthermore, it is disadvantageous that the removal of the attachment element with the body can be quite difficult and time-consuming.

Great Britain Patent Application No. 679 441 describes an attachment clip with which electronic components such as coils, switches, etc., can be attached to a carrier plate. The attachment clip consists of a spring part which is pushed through the carrier plate through corresponding openings. The component to be attached is pushed into the springs of the attachment clip, which have been pushed through, from the opposite side of the carrier plate, and locked in place with catch projections. To remove the component, the catch projections must be lifted up with a special tool to release these catch projections from the component.

Great Britain Patent Application No. 1 581 773 describes an attachment ring or locking ring, in which resilient hooks can be caught into corresponding teeth of a body. To attach the body in a bore of a plate, the attachment clip or locking ring is first pushed onto the body until head contact is made. Then, the body is pushed into the prepared opening of the plate, against the pressure of the resilient hooks. The body is released by being pushed out against the spring pressure of the hooks from the rear.

SUMMARY OF THE INVENTION

In contrast, the attachment element according to the present invention, has the advantage that the body can be installed in a pre-determined position even at a large angle of inclination of the wall. No special tools or aids are required. It is also particularly advantageous that removal of the body can take place without special tools or aids, since the catch hooks which engage in one another are released from the corresponding depressions by simple pressure on at least one part of the attachment element, and the attachment element can be removed.

It is further advantageous that with the arrangement of the catch hooks preferably on two opposite sides, they can be easily unlocked, so that the attachment element can be removed from the body and pulled out of the bore.

Because of the resilient structure of the attachment element and the cavity between the attachment element and the body, the lock can be released by simple pressure on these points. This is particularly advantageous in tight spaces, where it is difficult to perform a screw connection, for example, for space reasons.

A particularly simple structure of the attachment element results from the elliptical shape, since it can easily be pressed on its long sides and thereby the diameter of the elliptical opening on its narrow side is increased. If the catch hooks are arranged on this diameter, then they lift off the surface of the body when pressed together. This process can easily be carried out at locations on the bumper or a part of the car body which are not easily accessible.

The structure of the attachment element with two pressure springs which are connected with a wedge-shaped contact part results in the possibility that secure attachment of the body is possible even at large angles of inclination relative to the wall of a car body part. Even in these cases, the contact pressure is evenly distributed over both tips of the molded part.

Particularly simple production results if the attachment element is injection-molded in one piece, for example of a plastic.

The attachment element is particularly well suited for attaching an ultrasound sensor to a car body part of a motor vehicle, since the ultrasound sensor must have a pre-determined angle of inclination relative to the road surface, in order to avoid road reflections.

BRIEF DESCRIPTION OF THE DRAWINGS

FIG. 1 shows a top view of an exemplary embodiment of an attachment element according to the present invention.

FIG. 2 shows a side view of the attachment element illustrated in FIG. 1.

FIG. 3 shows a cross-section of the attachment element illustrated in FIGS. 1 and 2.

DETAILED DESCRIPTION OF THE INVENTION

FIG. 1 shows an approximately ellipsoid attachment element 5 in a top view, in which the vertical axis 6 forms the large ellipsis diameter and the horizontal axis forms the small ellipsis diameter. On the small ellipsis axis, two pressure points 11 are shown on the right and the left, at which the attachment element is pushed over a body 3 with an approximately circular cross-section. In the region of the pressure points 11, catch hooks 4 are arranged between the inside of the attachment element 5 and the outside of the body 3, which engage with one another in the relaxed state of the attachment element 5. Because of a preferably elliptical shape, a cavity (elliptical opening 13) is formed between the attachment element 5 and the body 3, at the ends of the large semi-axis 6 of the ellipsis.

The method of functioning of the exemplary embodiment according to the present invention is further illustrated in FIG. 2. The body 3 has a contour equalization ring 10 at its left front part, with which the angle of inclination relative to a wall 12 can be pre-determined, and which serves as a stop in the installed state. As can further be seen in FIG. 2, the attachment element 5 has a wedge-shaped molded part 9, which is connected with a bottom part **5*a* of the attachment element 5 via two opposite pressure springs 8. The pressure springs 8 are structured in meander-shape, for example, and exert a pre-determined pressure on the wall 12 because of their material composition and shape. Alternatively, the pressure springs 8 can also be arranged between the two parts 9, 5*a* as screw springs. The catch projections 4, which engage in corresponding recesses in the body 3, are preferably arranged below the pressure springs. A gap 2 is provided between the wedge-shaped molded part 9 and the bottom part 5*a* of the attachment element 5, which bottom part 5*a* serves as a stop when the attachment element 5 is pressed into place. The two adjacent tips of the wedge-shaped molded part 9 are centered in such a way that they press onto the back of the wall 12 at the level of the center axis of the body 3. In this connection, the wedge angle is formed in such a way that the largest desired installation angle between the wall 12 and the body 3 can be set, and the tips of the molded part 9 exert the pressure transfer to the wall 12** approximately uniformly.

FIG. 3 shows a cross-section of the attachment element 5 with one or more catch hooks (projections) 4 on two opposite sides 7, which engage into corresponding recesses 4*a* of the body 3. The body 3 can be, for example, a housing of an ultrasound transducer, which is installed in a bumper for distance measurements, or in a motor vehicle body part for measurements of distance between objects. Both the body 3 and the attachment element 5 are preferably made of a plastic.

When the attachment element 5 is pushed onto the rear part of the body 3, the attachment element 5 is pushed on until the two tips of the molded part 9 press against the back of the wall. By pushing further at the pressure points 11, the bottom part 5*a* of the attachment element 5 is pushed against the pressure springs 8, until the bottom part 5*a* touches the wedge-shaped molded part 9 at the bottom. In this position, the attachment element 5 engages into the catch projections of the body 3 with the catch hooks 4. By means of the gap 2, a pre-determined pressure to attach the body 3 can therefore be produced, because of the spring hardness of the pressure springs 8. In this connection, the amount of pressure depends on the spring stiffness of the pressure spring 8 and the spring path which is pre-determined by the stop 2.

To release the attachment element 5, pressure is exerted on the bottom part of the attachment element 5, along the vertical axis 6, in accordance with the two arrow tips (FIG. 1). This causes the catch hooks 4 to lift off from the catch projections 4*a* of the body 3, so that the attachment element 5 can be pulled off to the back. After it is pulled off, the body 3 can be taken out towards the front.

What is claimed is:

1. An attachment element for receiving a body, the body having a body connecting portion and being insertable into a bore in a wall, the attachment element comprising:

an attachment element connecting portion for engaging with the body connecting portion;

at least one flexible resilient portion decoupling the attachment element connecting portion from the body connecting portion when a predetermined pressure is applied to the at least one flexible resilient portion to remove the attachment element from the body;

a bottom portion; and a molded portion being connected to the bottom portion via at least two pressure springs, the bottom portion and the molded portion being disposed along a center axis of the attachment element;

wherein the molded portion has a wedge shape and includes two wedge tips adjacent to each other, the two wedge tips pointing in an attachment direction to form a maximum angle of inclination with respect to the wall.

2. The attachment element according to claim 1, wherein the molded portion and the bottom portion form a predetermined delimitation gap, the bottom portion being utilized as a stop portion when the attachment element is projected on the body.

3. The attachment element according to claim 1, wherein the bottom portion includes at least two pressure points.

4. The attachment element according to claim 1, wherein the attachment element is a single-piece element.

5. The attachment element according to claim 1, wherein the attachment element is composed of a plastic material.

6. The attachment element according to claim 1, wherein the attachment element connecting portion includes catch hooks and grooves, and wherein the catch hooks of the attachment element connecting portion engage with grooves provided on the body connecting portion, and the grooves of the attachment element connecting portion engage with catch hooks provided on the body connecting portion.

7. The attachment element according to claim 6, wherein the catch hooks of the attachment element connecting portion arc arranged on a first side of the attachment element and on a second side of the attachment element, the first side being positioned opposite to the second side, the catch hooks of the attachment element connecting portion being positioned on a circumference of the attachment element.

8. The attachment element according to claim 6, wherein the attachment element includes a substantially elliptical opening for holding the body having a substantially circular shape.

9. The attachment element according to claim, 8, wherein the catch hooks of the attachment element connecting portion are arranged on an inner circumference of the attachment element.

10. The attachment element according to claim 1, wherein the attachment element includes a substantially elliptical opening for holding the body having a substantially circular shape.

11. The attachment element according to claim 1, wherein the bottom portion moves toward the molded portion along the center axis in response to an insertion pressure applied to the bottom portion.

12. The attachment element according to claim 1, wherein the at least two pressure springs compress in a direction parallel to the center axis in response to an insertion pressure applied along the center axis.

* * * * *